US012670888B2

(12) United States Patent
Terao et al.

(10) Patent No.: US 12,670,888 B2
(45) Date of Patent: Jun. 30, 2026

(54) ELECTRONIC MUSICAL INSTRUMENT, ELECTRONIC MUSICAL INSTRUMENT CONTROLLING METHOD AND NON-TRANSITORY COMPUTER-READABLE STORAGE MEDIUM

(71) Applicant: CASIO COMPUTER CO., LTD., Tokyo (JP)

(72) Inventors: Ken Terao, Iruma (JP); Tomomi Konishi, Fuchu (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 1099 days.

(21) Appl. No.: 17/732,075

(22) Filed: Apr. 28, 2022

(65) Prior Publication Data

US 2022/0375441 A1 Nov. 24, 2022

(30) Foreign Application Priority Data

May 21, 2021 (JP) ................................ 2021-085771

(51) Int. Cl.
*G10H 1/00* (2006.01)
*G10H 1/34* (2006.01)
*G10H 7/00* (2006.01)

(52) U.S. Cl.
CPC ........... *G10H 1/0008* (2013.01); *G10H 1/348* (2013.01); *G10H 7/002* (2013.01); *G10H 2220/221* (2013.01); *G10H 2220/265* (2013.01)

(58) Field of Classification Search
CPC ...... G10H 1/0008; G10H 1/348; G10H 7/002; G10H 2220/221; G10H 2220/265
USPC .......................................................... 84/602
See application file for complete search history.

(56) References Cited

U.S. PATENT DOCUMENTS 5,241,128 A * 8/1993 Imaizumi ............... G10H 1/361 84/622
6,031,175 A 2/2000 Tozuka
6,342,663 B1 * 1/2002 Kato .................... G09B 15/023 84/478

(Continued)

FOREIGN PATENT DOCUMENTS

JP H06222765 A 8/1994
JP H07146681 A 6/1995

(Continued)

OTHER PUBLICATIONS

Extended European Search Report (EESR) dated Oct. 17, 2022, issued in counterpart European Application No. 22170204.6.

*Primary Examiner* — Jeffrey Donels
*Assistant Examiner* — Philip G Scoles
(74) *Attorney, Agent, or Firm* — Holtz, Holtz & Volek PC

(57) ABSTRACT

An electronic musical instrument includes at least one function operator associated with at least one process, and at least one processor, wherein the at least one processor executes the followings, deciding that musical performance is being performed or not in response to an operation to the at least one function operator, in response to deciding that the musical performance is being performed, executing the at least one process associated with the at least one function operator, and in response to deciding that the musical performance is not being performed, not executing the process associated with the at least one function operator, despite being operated to the at least one function operator.

14 Claims, 5 Drawing Sheets

(56) References Cited

U.S. PATENT DOCUMENTS

| | | | | |
|---|---|---|---|---|
| 2007/0234882 | A1 * | 10/2007 | Usa | G10H 1/0008 84/612 |
| 2008/0188967 | A1 * | 8/2008 | Taub | G10H 1/00 700/94 |

FOREIGN PATENT DOCUMENTS

| | | | |
|---|---|---|---|
| JP | H08286665 | A | 11/1996 |
| JP | 2009193010 | A | 8/2009 |
| JP | 2021043372 | A | 3/2021 |

* cited by examiner

ELECTRONIC MUSICAL INSTRUMENT, ELECTRONIC MUSICAL INSTRUMENT CONTROLLING METHOD AND NON-TRANSITORY COMPUTER-READABLE STORAGE MEDIUM

BACKGROUND

1. Field

The present disclosure relates to an electronic musical instrument such as an electronic keyboard instrument and so forth, an electronic musical instrument controlling method and a non-transitory computer-readable storage medium.

2. Related Art

An electronic musical instrument which emits a musical sound in accordance with a musical performance operation that a player conducts on a musical performance operator and executes processes other than a process of emitting the musical sound in accordance with an operation that the player conducts on an operator which is different from the musical performance operator is known. For example, Japanese Patent Application Laid Open No. 2021-43372 discloses an electronic musical device which emits the musical sound in accordance with the musical performance operation that the player conducts on a keyboard that a musical performance operation unit includes and executes sound volume adjustment which is a process other than a process for musical sound emission in accordance with the operation that the player performs on an operation switch that a setting operation unit includes.

SUMMARY

According to one aspect of the present disclosure, there is provided an electronic musical instrument includes: at least one function operator associated with at least one process; and at least one processor, wherein the at least one processor executes the followings: deciding that musical performance is being performed or not in response to an operation to the at least one function operator, in response to deciding that the musical performance is being performed, executing the at least one process associated with the at least one function operator, and in response to deciding that the musical performance is not being performed, not executing the process associated with the at least one function operator, despite being operated to the at least one function operator.

DETAILED DESCRIPTION

Figure 1:
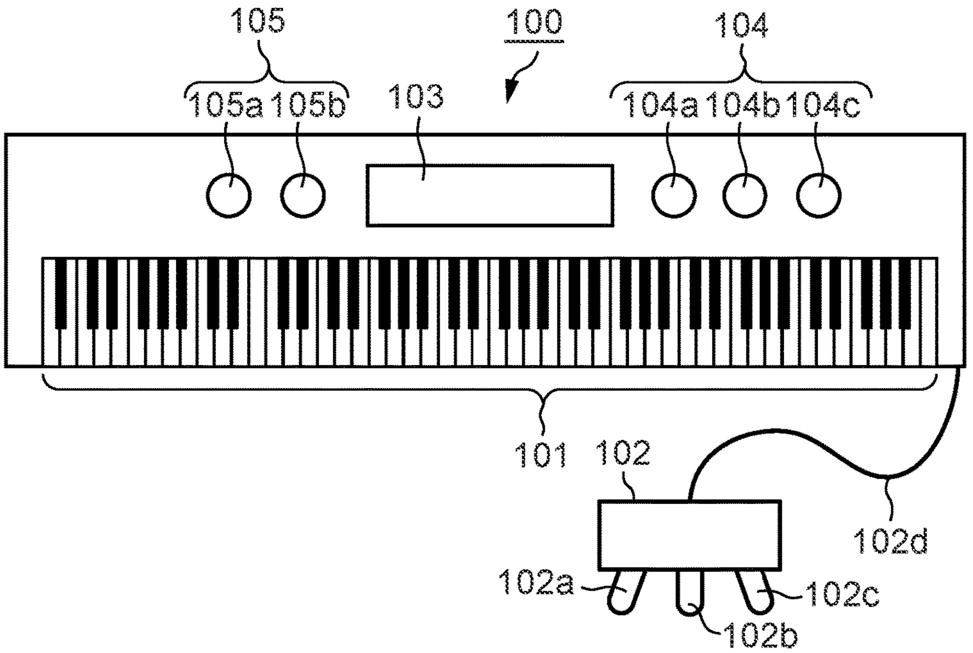
FIG. 1 is a diagram illustrating one example of an outer appearance of an electronic keyboard instrument according to the first embodiment of the present disclosure.

In the following, an electronic keyboard instrument according to the first embodiment of the present disclosure will be described with reference to the drawings. In the drawings, mutually same symbols are assigned to mutually same or equivalent constitutional elements.

An electronic keyboard instrument 100 which is illustrated in FIG. 1 includes a plurality of musical performance operators which each accepts each musical performance operation which is conducted by a player, that is, a user who conducts musical performance by using the electronic keyboard instrument 100 and outputs each musical sound in accordance with the musical performance operation which is conducted on each musical performance operator. The electronic keyboard instrument 100 is one example of the electronic musical instrument. The electronic keyboard instrument 100 includes a keyboard 101, a pedal unit 102, a display 103, a first operation switch group 104 and a second operation switch group 105 as illustrated in FIG. 1.

The keyboard 101 includes 88 keys which are the musical performance operators which each accepts the musical performance operation such as a key-pressing operation, a key-releasing operation and so forth that the player conducts by using his/her finger. The electronic keyboard instrument 100 outputs the musical sound in accordance with the key-pressing operation which is performed on each key that the keyboard 101 includes. Incidentally, the player may conduct the musical performance operation on each key by using parts of his/her body other than finger such as his/her elbow, toe and so forth.

The pedal unit 102 includes 3 pedals which are the musical performance operators which each accepts a musical performance operation that the player conducts by using his/her toe, that is, the musical performance operation that the player conducts by pressing each pedal with his/her toe. Specifically, the pedal unit 102 includes a soft pedal 102*a*, a sostenuto pedal 102*b* and a damper pedal 102*c*. Acoustic effects which are added to musical sounds that an acoustic piano emits in a case where the player conducts the key-pressing operations on keys that the acoustic piano includes in a state of pressing a soft pedal, a sostenuto pedal and a damper pedal that the acoustic piano includes are correlated with the soft pedal 102*a*, the sostenuto pedal 102*b* and the damper pedal 102*c* respectively. That is, the acoustic effect for softening the tone of each musical sound is correlated with the soft pedal 102*a*. The acoustic effect for elongating a sound-emitting time of each musical sound which is emitted in accordance with conduction of the key-pressing operation on the key on which the key-pressing operation is conducted at a time point that the player presses the sostenuto pedal 102*b* is correlated with the sostenuto pedal 102*b*. The acoustic effect for elongating the sound-emitting time of each musical sound in a state of maintaining a lingering sound with the finger being detached from the key is correlated with the damper pedal 102*c*. In a case where the player conducts the key-pressing operation on one key that the keyboard 101 includes in a state of pressing the soft pedal 102a, the sostenuto pedal 102b or the damper pedal 102c, the electronic keyboard instrument 100 outputs a musical sound to which the acoustic effect which is correlated with the pressed pedal is added. The pedal unit 102 is connected to an input/output interface 108 which will be described later via a connection cable 102d.

The display 103 displays various images such as an operation screen, a warning screen and so forth in accordance with control by a display control circuit 109 which will be described later.

Each of the first operation switch group 104 and the second operation switch group 105 is configured by a plurality of operation switches which is different from the plurality of musical performance operators and accepts an operation that the player performs. The respective operation switches are correlated with mutually different switching processes in advance and accept instructions for execution of the switching processes which are correlated therewith respectively in accordance with the operation which is performed by the player. The switching process is a process which is executed for a purpose other than emission of the musical sound. In the following, for easy understanding, the operation switch which configures the first operation switch group 104 will be referred to as a "first operation switch" and the operation switch which configures the second operation switch group 105 will be referred to as a "second operation switch". The first operation switch is one example of a function operator and the switching process which is correlated with the first operation switch is one example of the process which is correlated with the function operator.

The first operation switch group 104 is configured by a volume adjustment switch 104a, a pitch adjustment switch 104b and a tone selection switch 104c. The volume adjustment switch 104a is the first operation switch which is correlated with the switching process of adjusting the volume of each musical sound. The pitch adjustment switch 104b is the first operation switch which is correlated with the switching process of adjusting the pitch of each musical sound. The tone selection switch 104c is the first operation switch which is correlated with the switching process of selecting the tone of each musical sound. It is possible for the electronic keyboard instrument 100 to output the musical sounds in tones of a plurality of kinds of musical instruments such as an acoustic piano, an organ, a saxophone and so forth and it becomes possible for the player to designate the tone of any kind of musical instrument as the tone that the electronic keyboard instrument 100 outputs the musical sound by operating the tone selection switch 104c. Incidentally, the first operation switch group 104 may include an operation switch which is correlated with an optional switching process in addition to the volume adjustment switch 104a to the tone selection switch 104c or in place of the volume adjustment switch 104a to the tone selection switch 104c.

The second operation switch group 105 is configured by a power source switch 105a and a mode selection switch 105b. The power source switch 105a is the second operation switch which is correlated with a switching process of switching ON/OFF of a power source of the electronic keyboard instrument 100. The mode selection switch 105b is the second operation switch which is correlated with a switching process of selecting a control mode of the electronic keyboard instrument 100. The electronic keyboard instrument 100 works in any control mode among an operation lock OFF mode, an operation lock ON mode and an operation lock AUTO mode all of which will be described later. It is possible for the player to designate in which control mode the electronic keyboard instrument 100 works by operating the mode selection switch 105b.

Figure 2:
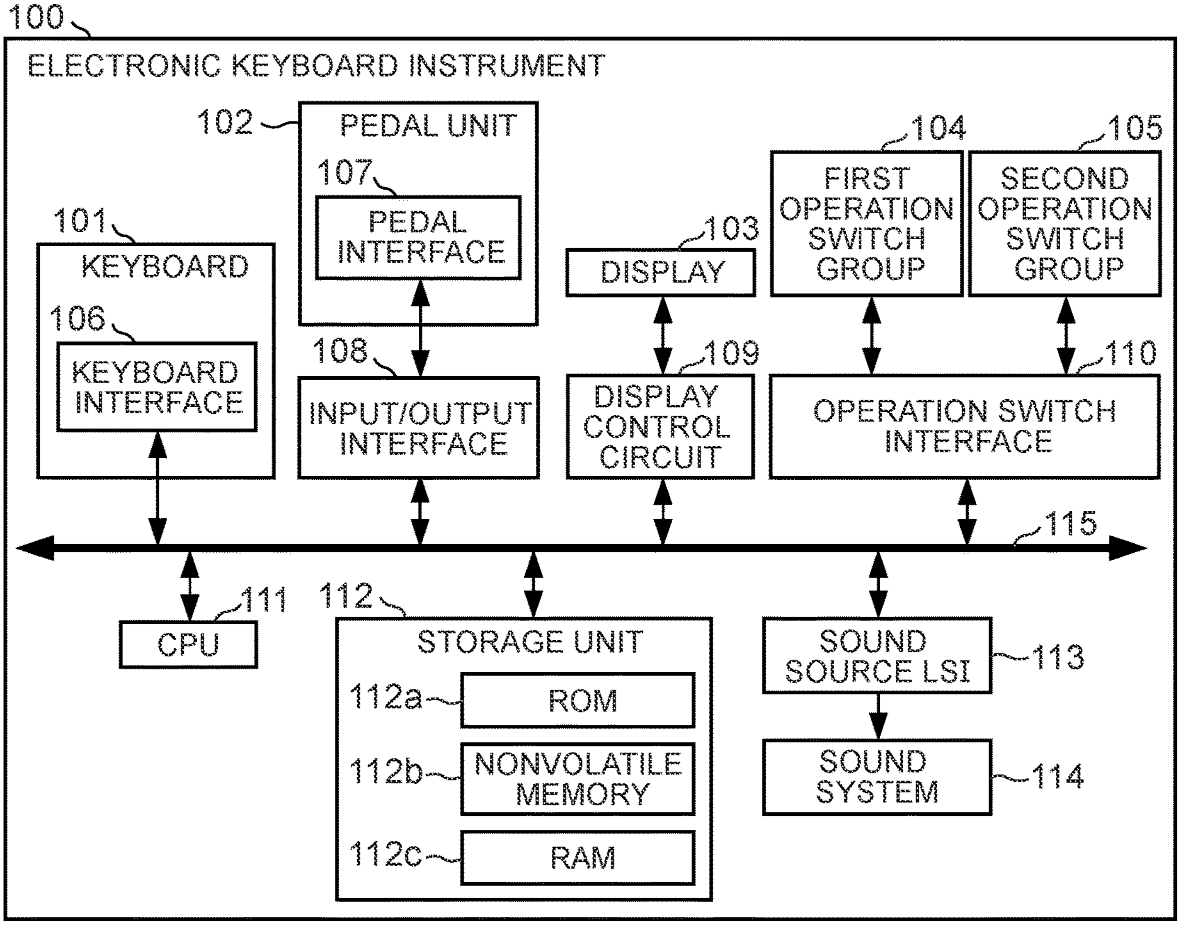
FIG. 2 is a diagram illustrating one example of an electric configuration of the electronic keyboard instrument according to the first embodiment of the present disclosure.

The electronic keyboard instrument 100 includes a keyboard interface 106, a pedal interface 107, an operation switch interface 110, a CPU (Central Processing Unit) 111, a storage unit 112, a sound source LSI (Large Scale Integration) 113, a sound system 114 and a system bus 115 as illustrated in FIG. 2 in addition to the respective constitutional elements such as, for example, the input/output interface 108, the display control circuit 109 and so forth.

The keyboard interface 106 includes a plurality of key sensors (not illustrated), detects the musical performance operation which is conducted on each key that the keyboard 101 includes by each key sensor which is installed for each key, generates key operation information which accords with a detection result and outputs the generated key operation information to the CPU 111. Specifically, in a case where the keyboard interface 106 detects the key-pressing operation which is performed on one key, the keyboard interface 106 detects a key-pressed-time velocity which corresponds to a speed that the key pressing operation is performed, generates key operation information which indicates the key number of the key that the key pressing operation is performed and the detected key-pressed-time velocity and outputs the generated key operation information to the CPU 111. In a case where the keyboard interface 106 detects a key-releasing operation which is performed on one key, the keyboard interface 106 detects a key-released-time velocity which corresponds to a speed of the key releasing operation, generates key operation information which indicates the key number of the key that the key releasing operation is performed and the detected key-released-time velocity and outputs the generated key operation information to the CPU 111.

The pedal interface 107 includes a plurality of pedal sensors (not illustrated), detects a musical performance operation which is conducted on each pedal that the pedal unit 102 includes by each pedal sensor which is installed for each pedal, generates pedal operation information which accords with a result of detection and outputs the generated pedal operation information to the CPU 111. Specifically, in a case where the pedal interface 107 detects the musical performance operation which is conducted on one pedal, the pedal interface 107 detects a pedaling-dependent displacement amount of that pedal which corresponds to an operation amount of the musical performance operation which is conducted on that pedal, generates pedal operation information which indicates that the musical performance operation is conducted on which pedal and the detected pedal displacement amount and outputs the generated pedal operation information to the CPU 111. The pedal interface 107 is installed on the pedal unit 102 and is connected to the input/output interface 108 via the connection cable 102d. The pedal interface 107 performs wired communications with the input/output interface 108 via the connection cable 102d and thereby outputs the pedal operation information to the input/output interface 108 and then outputs the pedal operation information to the CPU 111 via the input/output interface 108.

The input/output interface 108 includes a wireless communication module and a wired communication module (none of them are illustrated), performs wireless communications or the wired communications with external devices which are installed outside the electronic keyboard instrument 100 and thereby performs data exchange with the external devices. The input/output interface 108 includes a connection port (not illustrated) to which the connection cable 102*d* is to be connected and outputs the pedal operation information which is input from the pedal interface 107 via the wired communications over the connection cable 102*d* to the CPU 111.

The display control circuit 109 controls the operation of the display 103 in accordance with control by the CPU 111 and makes the display 103 display the various images such as the operation screen, the warning screen and so forth as described above.

The operation switch interface 110 includes a plurality of operation switch sensors (not illustrated), detects an operation which is performed on each first operation switch which configures the first operation switch group 104 and an operation which is performed on each second operation switch which configures the second operation switch group 105, generates switch operation information which indicates a result of detection of the operations and outputs the generated switch operation information to the CPU 111.

The CPU 111 controls operations of respective units of the electronic keyboard instrument 100 in accordance with a program and data which are stored in the storage unit 112.

The storage unit 112 includes a ROM (Read Only Memory) 112*a* and a data-writable nonvolatile memory 112*b* such as a flash memory, an EPROM (Erasable Programmable Read Only Memory) and so forth and stores the program and data that the CPU 111 uses for execution of various processes in a nonvolatile manner. Sound waveform data which indicates sound waveforms of the musical sounds of the plurality of respective kinds of musical instruments is stored in the ROM 112*a* in advance. As will be described later, the sound waveform data which is stored in the ROM 112*a* is used for generation of musical sound signals which indicate the musical sounds by the sound source LSI 113. The storage unit 112 includes a RAM (Random Access Memory) 112*c* which functions as a work area of the CPU in addition to the ROM 112*a* and the nonvolatile memory 112*b*.

The sound source LSI 113 generates each musical sound signal which indicates each musical sound and outputs the generated musical sound signal to the sound system 114 in accordance with control by the CPU 111. The musical sound signal is a digital sound signal which indicates a sound waveform of each musical sound. The sound source LSI 113 is one example of a sound source. Details of generation of the sound signal by the sound source LSI 113 will be described later.

The sound system 114 outputs the musical sound in accordance with the musical sound signal which is input from the sound source LSI 113. The sound system 114 is one example of a musical sound output means. Specifically, the sound system 114 includes a DAC (Digital to Analog Converter), an amplifier and a loudspeaker (none of them are illustrated), converts the musical sound signal which is input from the sound source LSI 113 into an analog sound signal by the DAC, amplifies that analog sound signal by the amplifier and emits the amplified analog sound signal over the loudspeakers. Incidentally, the sound system 114 may output the analog sound signal which is amplified by the amplifier to an external device such as a headphone and so forth via a output terminal (not illustrated) instead of emission of the amplified analog sound signal over the loudspeakers.

The system bus 115 is a path for transmission of data and commands and connects the keyboard interface 106, the input/output interface 108, the display control circuit 109, the operation switch interface 110, the CPU 111, the storage unit 112 and the sound source LSI 113 with one another.

Figure 3:
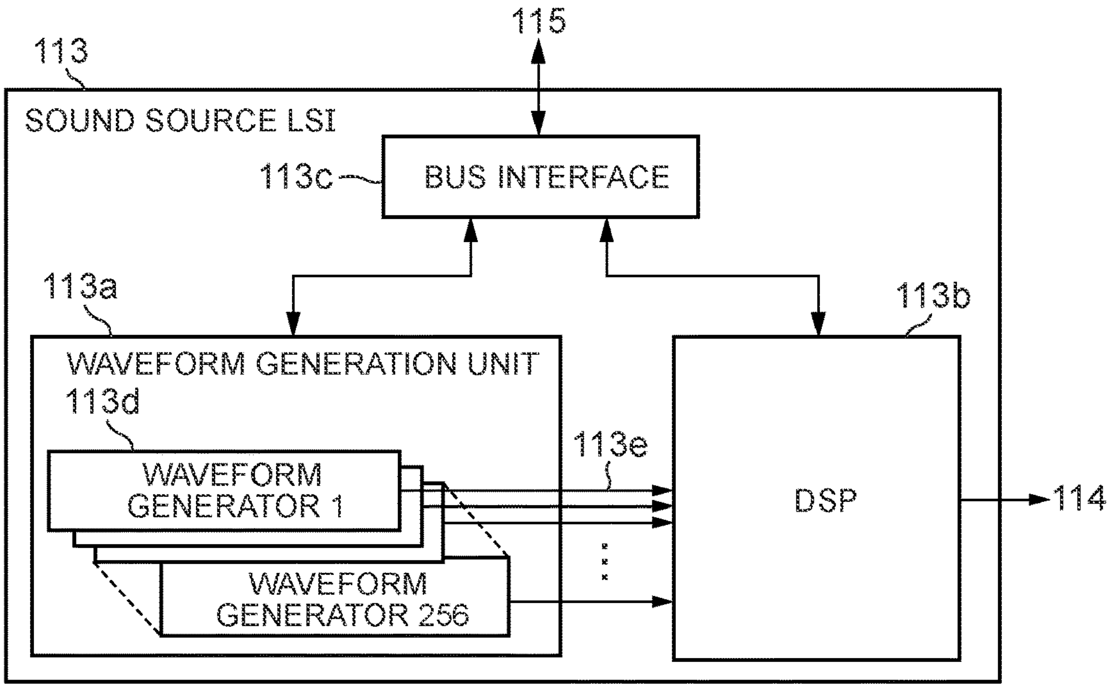
FIG. 3 is a diagram illustrating one example of a configuration of a sound source LSI (Large Scale Integration) in the first embodiment of the present disclosure.

In the following, details of generation of the musical sound signal by the sound source LSI 113 will be described with reference to FIG. 3. As illustrated in FIG. 3, the sound source LSI 113 includes a waveform generation unit 113*a* which has 256 waveform generators 113*d*, a DSP (Digital Signal Processor) 113*b* and a bus interface 113*c*. The waveform generation unit 113*a* and the DSP 113*b* are connected to the system bus 115 via the bus interface 113*c* and transmit/receive data to/from the respective units of the electronic keyboard instrument 100 including the CPU 111 and the ROM 112*a* via the bus interface 113*c* and the system bus 115.

Each waveform generator 113*d* that the waveform generation unit 113*a* includes reads out the sound waveform data which is stored in the ROM 112*a* in accordance with control by the CPU 111 and generates the waveform signal which indicates the sound waveform in accordance with the read-out sound waveform data. The respective waveform generators 113*d* output the generated waveform signals to the DSP 113*b* via mutually different channels 113*e*. Any one of the numbers "0" to "255" is uniquely correlated with any one of 256 waveform generators 113*d* as the identifier in advance. The waveform generation unit 113*a* generates generator operation information which indicates whether each waveform generator 113*d* generates the waveform signal and outputs the generated generator operation information to the CPU 111.

The DSP 113*b* generates the musical sound signal in accordance with the waveform signals which are input from the respective waveform generators 113*b*. That is, the DSP 113*b* performs signal processing on the waveform signals which are input from the respective waveform generators 113*d* in accordance with control by the CPU 111 and generates each musical sound signal by mixing the waveform signals which are subjected to the signal processing together. Specifically, the DSP 113*b* performs the signal processing of changing the sound waveform that each waveform signal indicates in accordance with a parameter which is indicated by musical sound parameter information which is input from the CPU 111 and designates the parameter of each musical sound on the waveform signals which are input from the respective waveform generators 113*d*. In addition, the DSP 113*b* performs signal processing of adding the acoustic effect which is indicated by effect information which is input from the CPU 111 and designates the acoustic effect which is to be added to each musical sound on the waveform signals which are input from the respective waveform generators 113*d*. The DSP 113*b* outputs the generated musical sound signal to the sound system 114.

Figure 4:
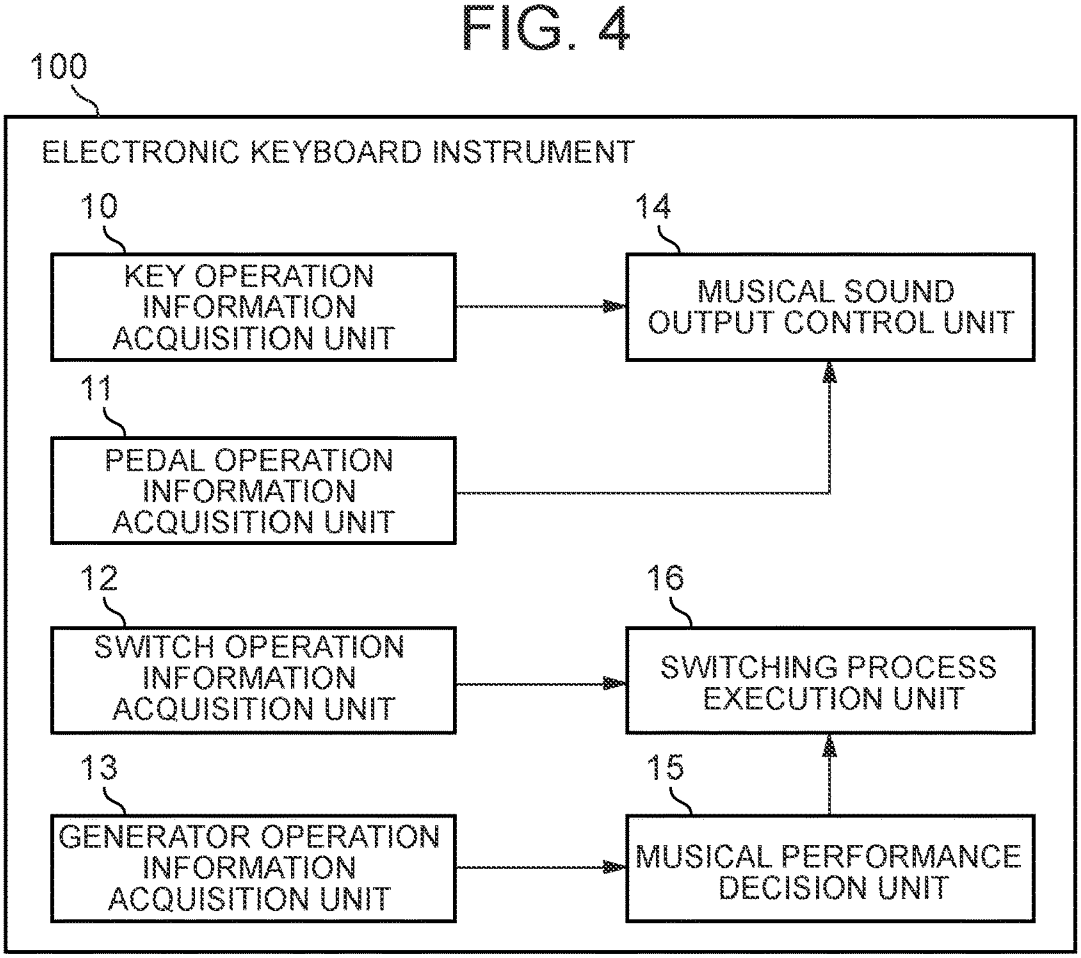
FIG. 4 is a diagram illustrating one example of a functional configuration of the electronic keyboard instrument according to the first embodiment of the present disclosure.

The electronic keyboard instrument 100 which includes the above physical constitutional elements as a physical configuration includes a key operation information acquisition unit 10, a pedal operation information acquisition unit 11, a switch operation information acquisition unit 12, a generator operation information acquisition unit 13, a musical sound output control unit 14, a musical performance decision unit 15 and a switching process execution unit 16 as functional constitutional elements as illustrated in FIG. 4. Functions of the key operation information acquisition unit 10 to the switching process execution unit 16 are realized by the CPU 111. That is, the CPU 111 controls operations of the respective units of the electronic keyboard instrument 100 by executing the program which is stored in the ROM 112*a* and thereby functions as the key operation information acquisition unit 10 to the switching process execution unit 16.

The key operation information acquisition unit 10 acquires the key operation information from the keyboard interface 106. The pedal operation information acquisition unit 11 acquires the pedal operation information from the pedal interface 107. The switch operation information acquisition unit 12 acquires the switch operation information from the operation switch interface 110. The generator operation information acquisition unit 13 acquires the generator operation information from the waveform generation unit 113*a* of the sound source LSI 113.

The musical sound output control unit 14 makes the sound system 114 which is the musical sound output means output the musical sound which accords with the musical performance operations that the player conducts on the keys and the pedals which are the musical performance operators. Specifically, the musical sound output control unit 14 makes the sound source LSI 113 generate the musical sound signal in accordance with the key operation information which is acquired by the key operation information acquisition unit 10 and the pedal operation information which is acquired by the pedal operation information acquisition unit 11, makes the sound source LSI 113 output the generated musical sound signal to the sound system 114 and then makes the sound system 114 output the musical sound in accordance with the musical sound signal which is input from the sound source LSI 113. More specifically, the musical sound output control unit 14 decides the pitch, the volume and the tone of the musical sound in accordance with the key operation information, decides the parameter of the musical sound in accordance with the pitch, the volume and the tone which are decided and outputs musical sound parameter information which indicates the decided parameter of the musical sound to the DSP 113*b* of the sound source LSI 113. The DSP 113*b* performs the signal processing of changing the sound waveforms that the waveform signals indicate in accordance with the parameter which is indicated by the musical sound parameter information which is input from CPU 111 on the waveform signals which are input from the respective waveform generators 113*b* that the waveform generation unit 113*a* of the sound source LSI 113 includes, mutually mixes the waveform signals which are subjected to the signal processing and thereby generates the musical sound signal which indicates the musical sound which has the pitch, the volume and the tone which are decided by the CPU 111. In addition, the musical sound output control unit 14 decides the acoustic effect which is to be added to the musical sound in accordance with the pedal operation information and outputs the effect information which indicates the decided acoustic effect to the DSP 113*b*. The DSP 113*b* performs the signal processing of adding the acoustic effect which is indicated by the effect information which is input from the CPU 111 to the musical sound on the waveform signals which are input from the respective waveform generators 113*b*, mutually mixes the waveform signals which are subjected to the signal processing and thereby generates the musical sound signal which indicates the musical sound to which the acoustic effect which is decided by the CPU 111 is added.

The musical performance decision unit 15 decides whether the musical performance is conducted by the player by using the electronic keyboard instrument 100. The musical performance decision unit 15 is one example of a musical performance decision means. Specifically, the musical performance decision unit 15 decides whether the musical performance is conducted in accordance with whether at least one of the 256 waveform generators 113*d* that the waveform generation unit 113*a* of the sound source LSI 113 includes generates the waveform signal. That is, in a case where at least one of the 256 waveform generators generates the waveform signal, the musical performance decision unit 15 decides that the musical performance is conducted by the player. On the other hand, in a case where none of the 256 waveform generators generate the waveform signals, the musical performance decision unit 15 decides that the musical performance is not conducted by the player. The musical performance decision unit 15 decides whether each waveform generator 113*d* generates each waveform signal on the basis of the generator operation information which is acquired by the generator operation information acquisition unit 13.

In accordance with performance of the operation on the first operation switch (104*a*, 104*b* or 104*c*) or the second operation switch (105*a* or 105*b*), the switching process execution unit 16 executes the switching process which is correlated with the operated operation switch. The switching process execution unit 16 is one example of a process execution means. The switching process execution unit 16 detects the operation which is performed on the first operation switch or the second operation switch on the basis of the switch operation information which is acquired by the switch operation information acquisition unit 12.

In a case where the operation is performed on the first operation switch (104*a*, 104*b* or 104*c*), the switching process execution unit 16 controls execution of the switching process in accordance with a current control mode of the electronic keyboard instrument 100. Specifically, in a case where the operation is performed on the first operation switch in a state where the electronic keyboard instrument 100 works in the operation lock OFF mode in which it is valid to perform the operation on the first operation switch, the switching process execution unit 16 executes the switching process which is correlated with the operated first operation switch. In a case where the operation is performed on the first operation switch in a state where the electronic keyboard instrument 100 works in the operation lock ON mode in which it is invalid to perform the operation on the first operation switch, the switching process execution unit 16 does not execute the switching process which is correlated with the operated first operation switch.

In a case where the operation is performed on the first operation switch (104*a*, 104*b* or 104*c*) in a state where the electronic keyboard instrument 100 works in the operation lock AUTO mode, the switching process execution unit 16 controls execution of the switching process in accordance with a result of a decision which is made by the musical performance decision unit 15. That is, when the musical performance decision unit 15 decides that the musical performance is not conducted by the player in the case where the operation is performed on the first operation switch in the state where the electronic keyboard instrument 100 works in the operation lock AUTO mode, the switching process execution unit 16 executes the switching process which is correlated with the operated first operation switch. On the other hand, when the musical performance decision unit 15 decides that the musical performance is conducted by the player in the case where the operation is performed on the first operation switch in the state where the electronic keyboard instrument 100 works in the operation lock AUTO mode, the switching process execution unit 16 does not execute the switching process which is correlated with the operated first operation switch.

According to such physical and functional configurations, in a case where the player suspends the musical performance and operates the first operation switch (104*a*, 104*b* or 104*c*)

in the state where the electronic keyboard instrument 100 works in the operation lock AUTO mode, the switching process is executed. On the other hand, in a case where the body or the clothes of the player touches the first operation switch accidentally while the musical performance is being conducted and the operation is performed on the first operation switch against the player's will, the switching process is not executed. Therefore, according to such physical and functional configurations, it becomes possible to suppress a possibility that the musical performance would be hindered due to execution of the switching process which is a process other than processes which are executed for emission of the musical sound against the player's will while the musical performance is being conducted. In addition, according to such physical and functional configurations, in a case where the electronic keyboard instrument 100 works in the operation lock AUTO mode, execution/nonexecution of the switching process when the first operation switch is operated is switched in accordance with the result of the decision which is made by the musical performance decision unit 15. Therefore, according to such physical and functional configurations, it becomes possible to reduce an operation load which is exerted on the player in comparison with a case where the player switches execution/nonexecution of the switching process by operating the mode selection switch 105*b* and then switching the control mode of the electronic keyboard instrument 100.

As described above, the musical performance decision unit 15 decides whether the musical performance is conducted in accordance with whether at least one of the waveform generators 113*d* that the sound source LSI 113 includes generates the waveform signal and, in the case where the electronic keyboard instrument 100 works in the operation lock AUTO mode, the switching process execution unit 16 controls execution of the switching process in accordance with the result of that decision. According to such physical and functional configurations, it becomes possible to preferably decide whether the musical performance is conducted by the player on the basis of whether at least one of the waveform generators 113*d* generates the waveform signal and to preferably control execution of the switching process in accordance with the result of the decision which is made by the musical performance decision unit 15.

As described above, in the case where the operation is performed on the first operation switch (104*a*, 104*b* or 104*c*), the switching process execution unit 16 controls execution/nonexecution of the switching process in accordance with the current control mode of the electronic keyboard instrument 100 and the result of the decision which is made by the musical performance decision unit 15. On the other hand, in a case where the operation is performed on the second operation switch (105*a* or 105*b*), the switching process execution unit 16 executes the switching process which is correlated with the operated second operation switch regardless of the result of the decision which is made by the musical performance decision unit 15 also in a case where the electronic keyboard instrument 100 works in any control mode among the operation lock OFF mode, the operation lock ON mode and the operation lock AUTO mode. In other words, in the case where the second operation switch is operated, the switching process which is correlated with the operated second operation switch is typically executed.

In the following, main routine processing that the electronic keyboard instrument 100 which has the above physical and functional configurations executes will be described with reference to a flowchart in FIG. 5. In a case where the player turns the power source of the electronic keyboard instrument 100 ON by operating the power source switch 105*a*, the CPU 111 starts execution of the main routine processing which is illustrated in the flowchart in FIG. 5.

In a case where execution of the main routine processing is started, first, the CPU 111 executes an initialization process of initializing various settings of the electronic keyboard instrument 100 (step S101). In the initialization process in step S101, the current control mode of the electronic keyboard instrument 100 is set to the operation lock AUTO mode which is a default control mode. In the first embodiment, a control mode flag which indicates the current control mode of the electronic keyboard instrument 100 is set in a storage area of the RAM 112. A value of the control mode flag is set to any one of values "0" to "2" in accordance with the current control mode of the electronic keyboard instrument 100. Specifically, the value of the control mode flag is set to "0" in a case where the current control mode of the electronic keyboard instrument 100 is the operation lock AUTO mode, is set to "1" in a case where the current control mode of the electronic keyboard instrument 100 is the operation lock OFF mode, and is set to "2" in a case where the current control mode of the electronic keyboard instrument 100 is the operation lock ON mode respectively. In the initialization process in step S101, the current control mode of the electronic keyboard instrument 100 is set to the operation lock AUTO mode and the value of the control mode flag is set to "0" which is the value which corresponds to the operation lock AUTO mode.

After execution of the initialization process in step S101, the key operation information acquisition unit 10 acquires the key operation information from the keyboard interface 106 (step S102). After execution of the process in step S102, the pedal operation information acquisition unit 11 acquires the pedal operation information from the pedal interface 107 (step S103).

After execution of the process in step S103, the musical sound output control unit 14 executes a musical sound output controlling process of controlling output of a musical sound which is conducted by the sound system 114 (step S104). In the musical sound output controlling process in step S104, the musical sound output control unit 14 decides the pitch, the volume and the tone of the musical sound in accordance with the key operation information which is acquired in step S102 and decides the acoustic effect which is to be added to the musical sound in accordance with the pedal operation information which is acquired in step S103. Then, the musical sound output control unit 14 makes the sound source LSI 113 generate a musical sound signal which indicates the musical sound which has the decided pitch, volume and tone and to which the decided acoustic effect is added and makes the sound system 114 output the musical sound in accordance with the musical sound signal which is generated by the sound source LSI 113. Incidentally, in a case where the musical sound output control unit 14 detects that the key-releasing operation is performed on a key on the basis of the key operation information in the musical sound output controlling process, the musical sound output control unit 14 executes a sound weakening process of attenuating the volume of the musical sound which is being output. A silencing process of terminating output of the musical sound is contained in the sound weakening process.

After execution of the musical sound output controlling process in step S104, the CPU 111 executes a switch controlling process of controlling execution of the switching process (step S105). Details of the switch controlling process in step S105 will be described later. After execution of the switch controlling process in step S105, the CPU 111 decides whether the power source of the electronic keyboard instrument 100 is turned OFF (step S106). In a case where it is decided that the power source is not turned OFF (step S106: No), the process returns to step S102. According to such physical and functional configurations, the CPU 111 executes the processes in step S102 to step S106 repetitively until the power source of the electronic keyboard instrument 100 is turned OFF. In a case where it is decided that the power source is turned OFF in step S106 (step S106: Yes), the CPU 111 terminates execution of the main routine processing.

In the following, details of the switch controlling process which is to be executed in step S105 of the main routine processing will be described. In step S105, the CPU 111 executes the switch controlling process which is illustrated in a flowchart in FIG. 6.

In a case where execution of the switch controlling process is started, first, the switch operation information acquisition unit 12 acquires the switch operation information from the operation switch interface 110 (step S201). After execution of the process in step S201, the switching process execution unit 16 decides whether the operation is performed on either one of the plurality of second operation switches which configures the second operation switch group 105, that is, either the power source switch 105*a* or the mode selection switch 105*b* on the basis of the switch operation information which is acquired in step S201 (step S202).

In step S202, in a case where it is decided that the operation is not performed on either one of the second operation switches (step S202: No), the process shifts to step S204. On the other hand, in a case where it is decided that the operation is performed on either one of the second operation switches (step S202: Yes), the switching process execution unit 16 specifies the operated second operation switch on the basis of the switch operation information which is acquired in step S201 and executes the switching process which is correlated with the specified second operation switch (S203). Specifically, in step S203, in a case where the operation is performed on the power source switch 105*a*, the switching process execution unit 16 executes the switching process of switching ON/OFF of the power source of the electronic keyboard instrument 100. In addition, in a case where the operation is performed on the mode selection switch 105*b* in step S203, the switching process execution unit 16 executes the switching process of switching the current control mode of the electronic keyboard instrument 100. In a case where the switching process execution unit 16 executes the switching process of switching the current control mode of the electronic keyboard instrument 100, the switching process execution unit 16 executes a process of changing the value of the control mode flag to a value which accords with the control mode which is obtained after mode-switching.

Figure 6:
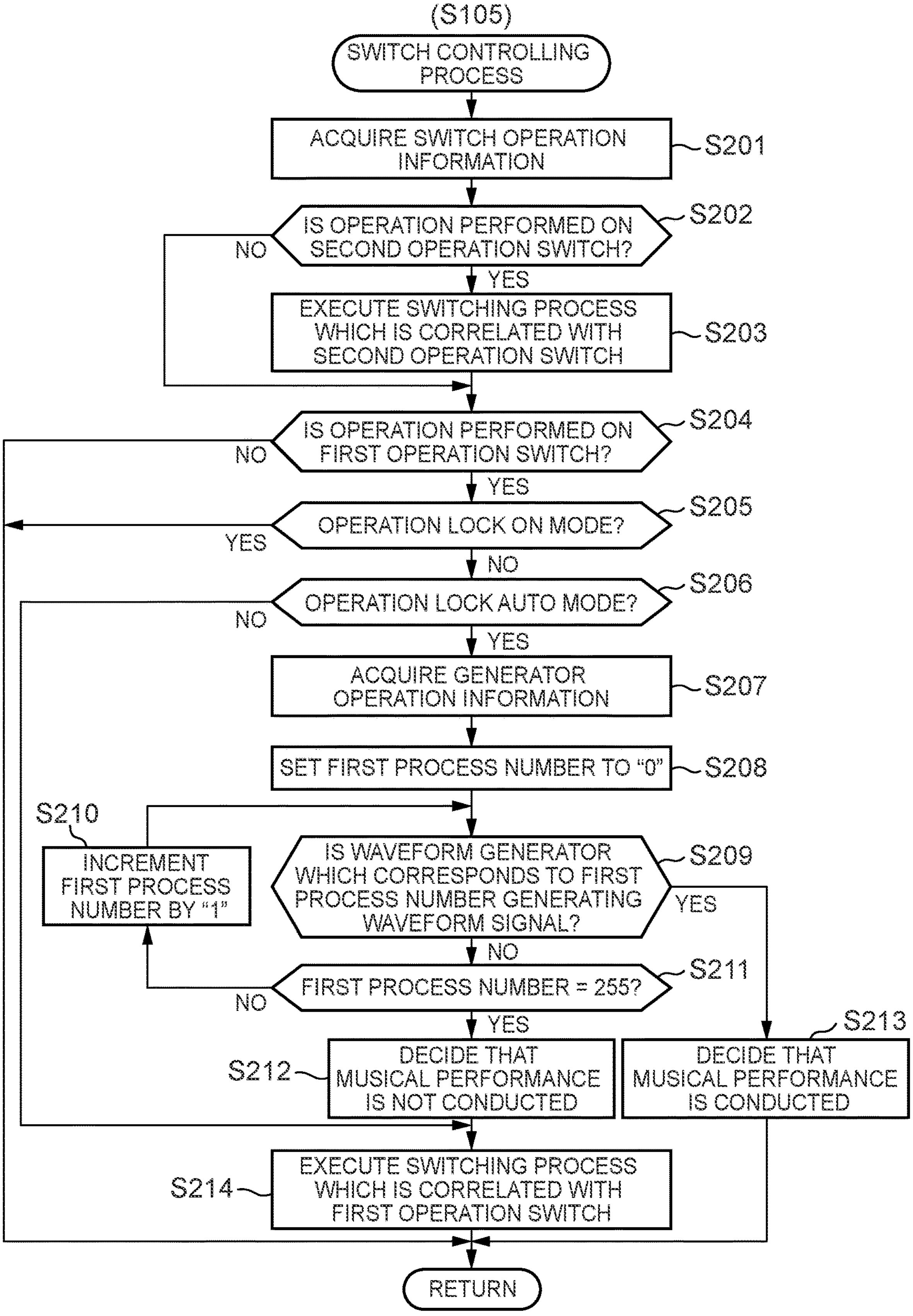
FIG. 6 is a flowchart for explanation of one example of a switch controlling process that the electronic keyboard instrument according to the first embodiment of the present disclosure executes.

In the switch controlling process which is illustrated in the flowchart in FIG. 6, in a case where it is decided that the operation is performed on either one of the second operation switches in this way (step S202: Yes), the process in step S203 is executed with no consideration of the current control mode of the electronic keyboard instrument 100. According to such physical and functional configurations, when the operation is performed on either one of the second operation switches, the switching process execution unit 16 executes the switching process which is correlated with the operated second operation switch no matter in which control mode the electronic keyboard instrument 100 works among the operation lock OFF mode, the operation lock ON mode and the operation lock AUTO mode.

After execution of the process in step S203, the process shifts to step S204. In step S204, the switching process execution unit 16 decides whether the operation is performed on which one of the plurality of first operation switches which configure the first operation switch group 104, that is, the volume adjustment switch 104*a*, the pitch adjustment switch 104*b* and the tone selection switch 104*c* on the basis of the switch operation information which is acquired in step S201 (step S204). In step S204, in a case where it is decided that the operation is not performed on any one of the first operation switches (step S204: No), the switching process execution unit 16 terminates execution of the switch controlling process. On the other hand, in a case where it is decided that the operation is performed on any one of the first operation switches (step S204: Yes), the switching process execution unit 16 decides whether the value of the control mode flag is “2” which is the value which corresponds to the operation lock ON mode and thereby decides whether the current control mode of the electronic keyboard instrument 100 is the operation lock ON mode (step S205). In a case where it is decided that the current control mode is not the operation lock ON mode (step S205: No), the switching process execution unit 16 decides whether the value of the control mode flag is “0” which is the value which corresponds to the operation lock AUTO mode and thereby decides whether the current control mode of the electronic keyboard instrument 100 is the operation lock AUTO mode (step S206).

In step S206, in a case where it is decided that the current control mode of the electronic keyboard instrument 100 is the operation lock AUTO mode (step S206: Yes), the generator operation information acquisition unit 13 acquires the generator operation information from the waveform generation unit 113*a* of the sound source LSI 113 (step S207). As described above, any one of the numbers “0” to “255” is uniquely correlated with any one of the 256 waveform generators 113*d* that the waveform generation unit 113*a* includes individually in advance as the identifier. After execution of the process in step S207, the musical performance decision unit 15 sets the first process number to the number which is the smallest in the numbers which are correlated with the respective waveform generators 113*d* as the identifiers, that is, “0” (step S208). After execution of the process in step S208, the musical performance decision unit 15 decides whether, in the waveform generators 113*d* that the waveform generation unit 113*a* includes, the waveform generator 113*d* which is correlated with the currently set first process number as the identifier generates the waveform signal on the basis of the generator operation information which is acquired in step S207 (step S209). For example, in a case where the first process number which is currently set is “0”, the musical performance decision unit 15 decides whether the waveform generator 113*d* which is correlated with the number “0” as the identifier generates the waveform signal.

In step S209, in a case where the musical performance decision unit 15 decides that the waveform generator 113*d* which is correlated with the first process number does not generate the waveform signal (step S209: No), the musical performance decision unit 15 decides whether the first process number which is currently set is the number which is the largest in the numbers which are correlated with the respective waveform generators 113*d* as the identifiers, that is, “255” (step S211). In step S211, in a case where the musical performance decision unit 15 decides that the first process number which is currently set is not "255" (step S211: No), the musical performance decision unit 15 increments the first process number by "1" (step S210) and the process returns to step S209. The musical performance decision unit 15 repetitively executes the decision process in step S209 while incrementing the first process number by "1" each time (step S210) and thereby decides whether each waveform generator 113*d* that the sound source LSI 113 includes generates the waveform signal. In step S211, in a case where the musical performance decision unit 15 decides that the first process number which is currently set is "255" (step S211: Yes), the musical performance decision unit 15 decides that the musical performance is not conducted (step S212). According to such physical and functional configurations, in a case where none of the waveform generators 113*d* that the sound source LSI 113 includes generate the waveform signals, the musical performance decision unit 15 decides that the musical performance is not conducted.

After execution of the process in step S212, the process shifts to step S214. In step S214, the switching process execution unit 16 specifies the first operation switch which is operated by the player on the basis of the switch operation information which is acquired in step S201 and executes the switching process which is correlated with the specified first operation switch (step S214). Specifically, in step S214, in a case where the operation is performed on the volume adjustment switch 104*a*, the switching process execution unit 16 executes the switching process of changing the volume of the musical sound. In addition, in step S214, in a case where the operation is performed on the pitch adjustment switch 104*b*, the switching process execution unit 16 executes the switching process of changing the pitch of the musical sound. In addition, in step S214, in a case where the operation is performed on the tone selection switch 104*c*, the switching process execution unit 16 executes the switching process of switching the tone of the musical sound. After execution of the process in step S214, the switching process execution unit 16 terminates execution of the switch controlling process.

As described above, when it is decided that the musical performance is not conducted (step S212) in a case where it is decided that the operation is performed on the first operation switch (104*a*, 104*b* or 104*c*) (step S204: Yes) and then it is decided that the electronic keyboard instrument 100 works in the operation lock AUTO mode (step S206: Yes), the process in step S214 is executed. According to such physical and functional configurations, when the musical performance decision unit 15 decides that the musical performance is not conducted in a case where the operation is performed on the first operation switch in the state where the electronic keyboard instrument 100 works in the operation lock AUTO mode, the switching process execution unit 16 executes the switching process which is correlated with the operated first operation switch.

When it is decided that the current control mode is the operation lock ON mode (step S205: Yes) in the process in step S205 which is executed in the case where it is decided that the operation is performed on the first operation switch (104*a*, 104*b* or 104*c*) in step S204 (step S204: Yes), the switching process execution unit 16 terminates execution of the switch controlling process with no execution of the process in step S214. According to such physical and functional configurations, in a case where the operation is performed on the first operation switch in the state where the electronic keyboard instrument 100 works in the operation lock ON mode, the switching process execution unit 16 does not execute the switching process which is correlated with the operated first operation switch.

The electronic keyboard instrument 100 works in any control mode among the operation lock OFF mode, the operation lock ON mode and the operation lock AUTO mode. Accordingly, in the process in step S206 which is executed in a case where it is decided that the current control mode of the electronic keyboard instrument 100 is not the operation lock ON mode in step S205 (step S205: No), the decision that the current control mode of the electronic keyboard instrument 100 is not the operation lock AUTO mode (step S206: No) is equivalent to the decision that the current control mode of the electronic keyboard instrument 100 is the operation lock OFF mode. In step S206, in a case where it is decided that the current control mode of the electronic keyboard instrument 100 is not the operation lock AUTO mode (step S206: No), that is, in a case where it is decided that the current control mode of the electronic keyboard instrument 100 is the operation lock OFF mode, the switching process execution unit 16 executes the process in step S214. According to such physical and functional configurations, in a case where the operation is performed on the first operation switch (104*a*, 104*b* or 104*c*) in the state where the electronic keyboard instrument 100 works in the operation lock OFF mode, the switching process execution unit 16 executes the switching process which is correlated with the operated first operation switch.

In step S209, in a case where it is decided that the waveform generator 113*d* which is correlated with the first process number generates the waveform signal (step S209: Yes), the musical performance decision unit 15 decides that the musical performance is conducted by the player (step S213). According to such physical and functional configurations, in a case where at least one of the waveform generators 113*d* that the sound source LSI 113 includes generates the waveform signal, the musical performance decision unit 15 decides that the musical performance is conducted. After execution of the process in step S213, the switching process execution unit 16 terminates execution of the switch controlling process with no execution of the process in step S214. According to such physical and functional configurations, in a case where the operation is performed on the first operation in the state where the electronic keyboard instrument 100 works in the operation lock AUTO mode, when the musical performance decision unit 15 decides that the musical performance is conducted, the switching process execution unit 16 does not execute the switching process which is correlated with the operated first operation switch.

As described above, the electronic keyboard instrument 100 includes the plurality of first operation switches which is one example of the function operators which accept the operation which is performed by the player, the musical performance decision unit 15 which decides whether the musical performance is conducted and the switching process execution unit 16 which executes the switching process which is correlated with the operated first operation switch in accordance with the operation which is performed on the first operation switch (104*a*, 104*b* or 104*c*). In the case where the operation is performed on the first operation switch in the state where the electronic keyboard instrument 100 works in the operation lock AUTO mode, when the musical performance decision unit 15 decides that the musical performance is not conducted, the switching process execution unit 16 executes the switching process which is correlated with the operated first operation switch. In the case where the operation is performed on the first operation switches in the state where the electronic keyboard instrument 100 works in the operation lock AUTO mode, when the musical performance decision unit 15 decides that the musical performance is conducted, the switching process execution unit 16 does not execute the switching process which is correlated with the operated first operation switch. According to such physical and functional configurations, it becomes possible to reduce the operation load which is exerted on the player while suppressing a possibility that the musical performance would be hindered.

In addition, the electronic keyboard instrument 100 includes the sound source LSI 113 which generates each musical sound signal which indicates each musical sound and the sound system 114 which outputs each musical sound in accordance with each musical sound signal. The sound source LSI 113 includes the plurality of waveform generators 113*d* which each generates each waveform signal and generates each musical sound signal in accordance with each waveform signal that each of the plurality of waveform generators 113*d* generates. The musical performance decision unit 15 decides whether the musical performance is conducted in accordance with whether at least one of the waveform generators 113*d* generates the waveform signal. According to such physical and functional configurations, it becomes possible to preferably control execution of each switching process.

Second Embodiment

In the first embodiment, the description is made on the presumption that the electronic keyboard instrument 100 is configured to decide whether the musical performance is conducted in accordance with whether at least one of the plurality of waveform generators 113*d* that the sound source LSI 113 includes generates the waveform signal and thereby to control execution of each switching process in accordance with the result of that decision. However, this configuration is merely one example and it is possible for the electronic keyboard instrument 100 to decide whether the musical performance is conducted by an optional method and thereby to control execution of each switching process in accordance with the result of that decision. In the following, the electronic keyboard instrument 100 according to the second embodiment of the present disclosure which is configured to decide whether the musical performance is conducted in accordance with whether the musical performance operation is performed on at least one of the plurality of musical performance operators and thereby to control execution of each switching process in accordance with a result of that decision will be described.

The electronic keyboard instrument 100 according to the second embodiment has almost the same physical and functional configurations as the electronic keyboard instrument 100 according to the first embodiment. However, the function of the musical performance decision unit 15 of the electronic keyboard instrument 100 according to the second embodiment is partially different from the function of the musical performance decision unit 15 of the electronic keyboard instrument 100 according to the first embodiment. In the following, the function of the musical performance decision unit 15 that the electronic keyboard instrument 100 according to the second embodiment includes will be described with a focus on points which are different from the points of the musical performance decision unit 15 in the first embodiment.

In the second embodiment, the musical performance decision unit 15 decides whether the musical performance is conducted in accordance with whether the musical performance is conducted on at least one of the plurality of musical performance operators that the electronic keyboard instrument 100 includes by the player. The electronic keyboard instrument 100 includes 88 keys which are installed on the keyboard 101 and 3 pedals which are installed on the pedal unit 102 as the musical performance operators as in the case of the first embodiment. In a case where the musical performance operation is conducted on at least one of the musical performance operators, that is, in a case where the musical performance operation is conducted on at least one of 88 keys and 3 pedals, the musical performance decision unit 15 decides that the musical performance is conducted by the player. On the other hand, in a case where the musical performance operation is not conducted on any of the musical performance operators, that is, in a case where the musical performance operation is not conducted on any of 88 keys and 3 pedals, the musical performance decision unit 15 decides that the musical performance is not conducted by the player. The musical performance decision unit 15 decides whether the musical performance is conducted on each key on the basis of the key operation information which is acquired by the key operation information acquisition unit 10 and then decides whether the musical performance is conducted on each pedal on the basis of the pedal operation information which is acquired by the pedal operation information acquisition unit 11.

In the second embodiment, in a case where the operation is performed on the first operation switch (104*a*, 104*b* or 104*c*) in the state where the electronic keyboard instrument 100 works in the operation lock AUTO mode as in the case of the first embodiment, the switching process execution unit 16 controls execution of each switching process in accordance with the result of the decision which is made by the musical performance decision unit 15. That is, in the case where the operation is performed on the first operation switch in the state where the electronic keyboard instrument 100 works in the operation lock AUTO mode, the switching process execution unit 16 executes the switching process which is correlated with the operated first operation switch when it is decided that the musical performance is not conducted by the musical performance decision unit 15 and does not execute the switching process which is correlated with the operated first operation switch when it is decided that the musical performance is conducted by the musical performance decision unit 15.

According to such physical and functional configurations, it becomes possible to preferably decide whether the musical performance is conducted by the player on the basis of whether the musical performance is conducted on at least one of the musical performance operators and to preferably control execution of the switching process in accordance with the result of that decision.

As described above, the electronic keyboard instrument 100 includes the plurality of keys and the plurality of pedals as the musical performance operators. Therefore, according to the configuration of the second embodiment, not only in a case where the player conducts the musical performance on one key but also in a case where although the player does not conduct the musical performance operation on any key, the player conducts the musical performance operation on one pedal, it becomes possible to detect that the musical performance is conducted and to preferably control execution of each switching process.

In the following, the operation of the electronic keyboard instrument 100 according to the second embodiment which has the above physical and functional configurations will be described with a focus on points which are different from points of the operation of the electronic keyboard instrument 100 according to the first embodiment. The electronic keyboard instrument 100 according to the second embodiment executes a switch controlling process which is illustrated in a flowchart in FIG. 7 in step S105 of the main routine processing which is illustrated in the flowchart in FIG. 5, in place of the switch controlling process which is illustrated in the flowchart in FIG. 6.

Figure 7:
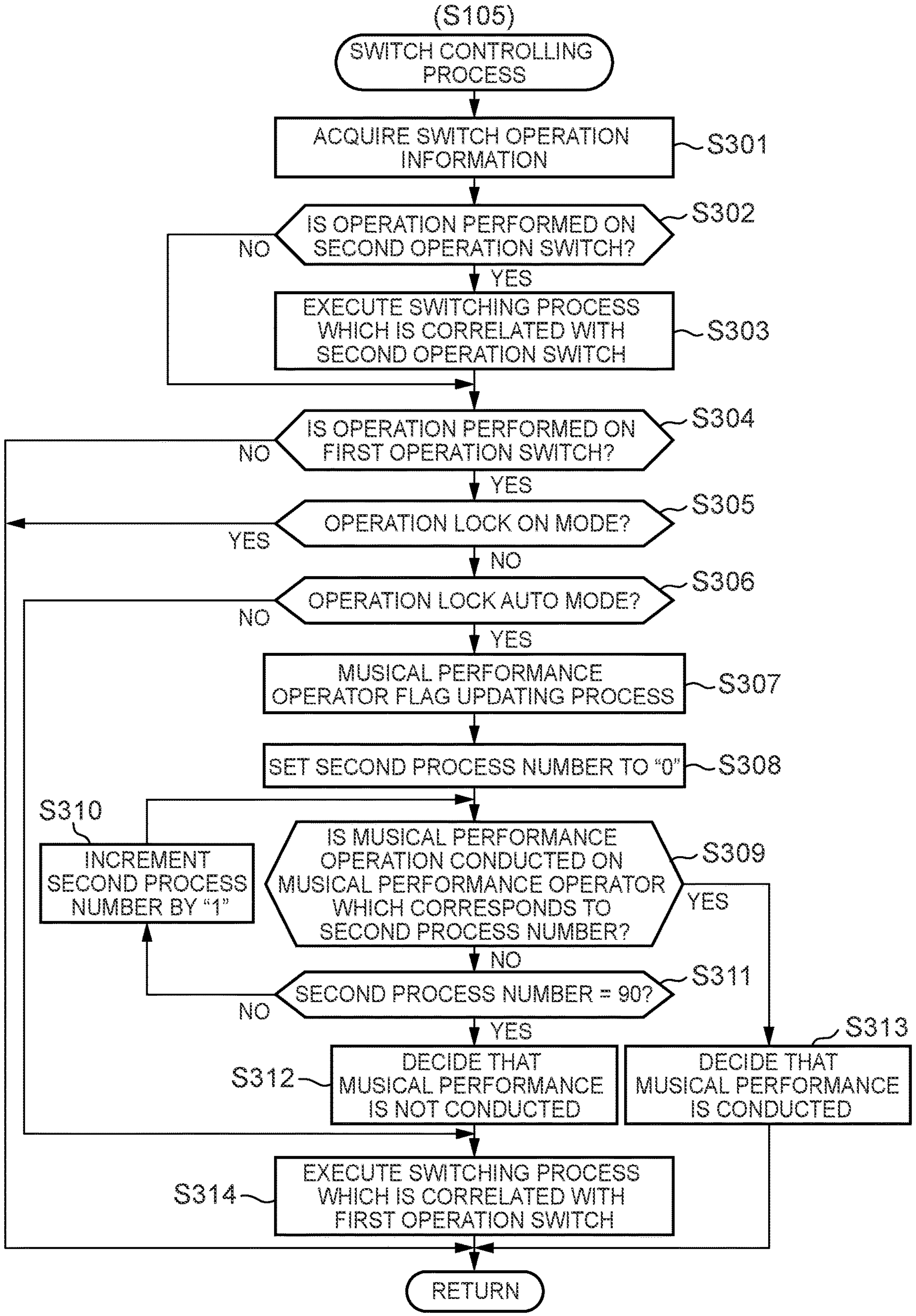
FIG. 7 is a flowchart for explanation of one example of a switch controlling process that an electronic keyboard instrument according to the second embodiment of the present disclosure executes.

In a case where execution of the switch controlling process which is illustrated in the flowchart in FIG. 7 is started, first, the switch operation information acquisition unit 12 acquires the switch operation information from the operation switch interface 110 (step S301). After execution of the process in step S301, the switching process execution unit 16 decides whether the operation is performed on any one of the plurality of second operation switches which configures the second operation switch group 105 on the basis of the switch operation information which is acquired in step S301 (step S302). In step S302, in a case where it is decided that the operation is not performed on any of the second operation switches (step S302: No), the process shifts to step S304. On the other hand, in a case where it is decided that the operation is performed on any one of the second operation switches (step S302: Yes), the switching process execution unit 16 specifies the operated second operation switch on the basis of the switch operation information which is acquired in step S301 and executes the switching process which is correlated with the specified second operation switch (step S303).

After execution of the process in step S303, the process shifts to step S304. In step S304, the switching process execution unit 16 decides whether the operation is performed on any one of the plurality of first operation switches which configures the first operation switch group 104 on the basis of the switch operation information which is acquired n step S301 (step S304). In step S304, in a case where it is decided that the operation is not performed on any of the first operation switches (step S304: No), the switching process execution unit 16 terminates execution of the switch controlling process. On the other hand, in a case where it is decided that the operation is performed on any one of the first operation switches (step S304: Yes), the switching process execution unit 16 decides whether the current control mode of the electronic keyboard instrument 100 is the operation lock ON mode (step S305).

In step S305, in a case where it is decided that the current control mode of the electronic keyboard instrument 100 is the operation lock ON mode (step S305: Yes), the switching process execution unit 16 terminates execution of the switch controlling process. On the other hand, in a case where it is decided that the current control mode of the electronic keyboard instrument 100 is not the operation lock ON mode (step S305: No), the switching process execution unit 16 decides whether the current control mode of the electronic keyboard instrument 100 is the operation lock AUTO mode (step S306). In step S306, in a case where it is decided that the current control mode of the electronic keyboard instrument 100 is not the operation lock AUTO mode (step S306: No), that is, in a case where it is decided that the current control mode of the electronic keyboard instrument 100 is the operation lock OFF mode, the process shifts to step S314. On the other hand, in step S306, in a case where it is decided that the current control mode of the electronic keyboard instrument 100 is the operation lock AUTO mode (step S306: Yes), the CPU 111 executes a musical performance operator flag updating process of updating a value of a musical performance operator flag (step S307). In the following, the musical performance operator flag and the musical performance operator flag updating process will be described.

The electronic keyboard instrument 100 includes 88 keys which are installed on the keyboard 101 and 3 pedals which are installed on the pedal unit 102 as the musical performance operators which amount to 91 in total. In the second embodiment, any one of the numbers “0” to “90” is uniquely correlated with each of the musical performance operators in advance as each identifier. Specifically, any one of the numbers “0” to “87” is uniquely correlated with each of 88 keys that the keyboard 101 includes in advance as each identifier. In addition, any one of the numbers “88” to “90” is uniquely correlated with each of three pedals that the pedal unit 102 includes, that is, the soft pedal 102*a*, the sostenuto pedal 102*b* and the damper pedal 102*c* in advance as each identifier.

In the second embodiment, 91 musical performance operator flags which indicate whether the musical performances are conducted on 91 musical performance operators respectively that the electronic keyboard instrument 100 includes are set in the storage area of the RAM 112*c*. Any one of the numbers “0” to “90” is uniquely correlated with each of the musical performance flags in advance as each identifier. The value of each musical performance operator flag is set to either “0” or “1” in accordance with whether the musical performance is conducted on the musical performance operator which is correlated with the number which is the same as the number which is correlated with each musical performance operator flag. Specifically, the value of each musical performance operator flag is set to “0” in a case where the musical performance operation is not conducted on each musical performance operator which is correlated with each musical performance flag and is set to “1” in a case where the musical performance operation is conducted on that musical performance operator which is correlated with that musical performance flag. For example, the value of the musical performance operator flag which is correlated with the number “3” is set to “0” in a case where the musical performance operation is not conducted on one key which is correlated with the number “3” and is set to “1” in a case where the musical performance operation is conducted on that correlated key.

Figure 5:
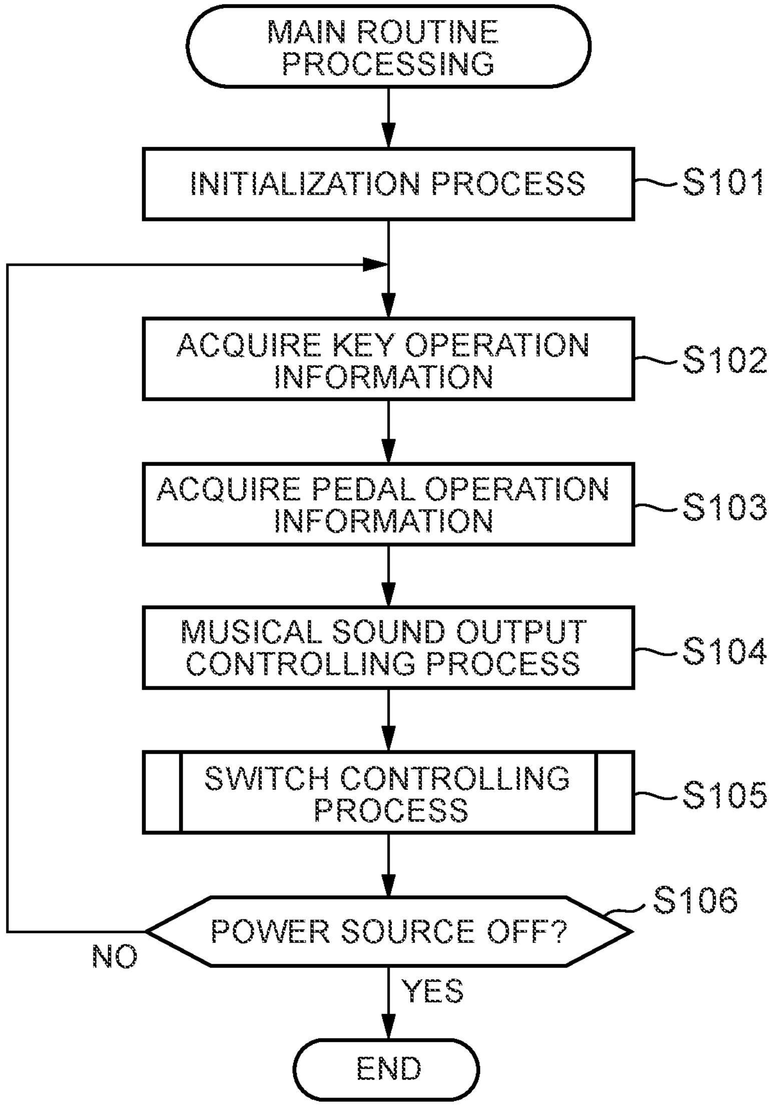
FIG. 5 is a flowchart for explanation of one example of main routine processing that the electronic keyboard instrument according to the first embodiment of the present disclosure executes.

In the second embodiment, in the initialization process which is executed in step S101 of the main routine processing which is illustrated in the flowchart in FIG. 5, the respective musical performance operator flags are cleared and the value of each of the musical performance operator flags is set to “0” which is the initial value.

In the musical performance operator flag updating process in step S307 in the flowchart in FIG. 7, the CPU 111 updates the value of each musical performance operator flag in accordance with the key operation information which is acquired in step S102 in the main routine processing and the pedal operation information which is acquired in step S103 in the main routine processing. That is, the CPU 111 specifies each key and each pedal on which the musical performance operations are not currently conducted on the basis of the key operation information and the pedal operation information and sets the values of the musical performance operator flags which are correlated with each key and each pedal which are specified to “0s” respectively. In addition, the CPU 111 specifies each key and each pedal on which the musical performance operations are currently conducted on the basis of the key operation information and the pedal operation information and sets values of the musical performance operator flags which are correlated with each key and each pedal which are specified to "1s" respectively.

After execution of the musical performance operator flag updating process in step S307, the musical performance decision unit 15 sets the second process number to "0" which is the smallest number in the numbers which are correlated with the respective musical performance operators as the identifiers (step S308). After execution of the process in step S308, the musical performance decision unit 15 decides whether the value of the musical performance operator flag which is correlated with the second process number which is currently set as the identifier is "1" and thereby decides whether the musical performance operation is conducted on the musical performance operator which is correlated with the second process number as the identifier (step S309). For example, in a case where the second process number which is currently set is "0", the musical performance decision unit 15 decides whether the value of the musical performance operator flag which is correlated with the number "0" is "1" and thereby decides whether the musical performance operation is conducted on the key which is correlated with the number "0".

In step S309, in a case where it is decided that the musical performance operation is not conducted on the musical performance operator which is correlated with the second process number (step S309: No), that is, in a case where it is decided that the value of the musical performance operator flag which is correlated with the second process number is not "1", the musical performance decision unit 15 decides whether the second process number which is currently set is the largest number in the numbers which are correlated with the respective musical performance operators as the identifiers, that is, "90" (step S311). In step S311, in a case where it is decided that the second process number which is currently set is not "90" (step S311: No), the musical performance decision unit 15 increments the second process number by "1" (step S310) and the process returns to step S309. The musical performance decision unit 15 decides whether the musical performance operation is conducted on each of the musical performance operators that the electronic keyboard instrument 100 includes by repetitively executing the decision process in step S309 while incrementing the second process number by "1" each time (step S310).

In step S311, in a case where it is decided that the second process number which is currently set is "90" (step S311: Yes), the musical performance decision unit 15 decides that the musical performance is not conducted (step S312). According to such physical and functional configurations, in a case where the musical performance operation is not conducted on any one of the musical performance operators that the electronic keyboard instrument 100 includes, the musical performance decision unit 15 decides that the musical performance is not conducted. After execution of the process in step S312, the process shifts to step S314. In step S314, the switching process execution unit 16 specifies the first operation switch which is operated by the player on the basis of the switch operation information which is acquired in step S301 and executes the switching process which is correlated with the specified first operation switch (step S314). According to such physical and functional configuration, when the musical performance decision unit 15 decides that the musical performance is not conducted in a case where the operation is performed on the first operation switch in the state where the electronic keyboard instrument 100 works in the operation lock AUTO mode, the switching process execution unit 16 executes the switching process which is correlated with the operated first operation switch. After execution of the process in step S314, the switching process execution unit 16 terminates execution of the switch controlling process.

In step S309, in a case where it is decided that the musical performance is conducted on the musical performance operator which is correlated with the second process number (step S309: Yes), that is, in a case where it is decided that the value of the musical performance operator flag which is correlated with the second process number is "1", the musical performance decision unit 15 decides that the musical performance is conducted by the player (step S313). According to such physical and functional configuration, in a case where the musical performance operation is conducted on at least one of the musical performance operators that the electronic keyboard instrument 100 includes, the musical performance decision unit 15 decides that the musical performance is conducted. After execution of the process in step S313, the switching process execution unit 16 terminates execution of the switch controlling process with no execution of the process in step S314. According to such physical and functional configuration, when the musical performance decision unit 15 decides that the musical performance is conducted in a case where the operation is performed on the first operation switch in the state where the electronic keyboard instrument 100 works in the operation lock AUTO mode, the switching process execution unit 16 does not execute the switching process which is correlated with the operated first operation switch.

As described above, the musical performance decision unit 15 of the electronic keyboard instrument 100 according to the second embodiment decides whether the musical performance operation is conducted in accordance with whether the musical performance is conducted on at least one of the plurality of musical performance operators which each accepts the musical performance operation which is conducted by the player. In a case where the operation is performed on the first operation switch in the state where the electronic keyboard instrument 100 works in the operation lock AUTO mode, the switching process execution unit 16 of the electronic keyboard instrument 100 according to the second embodiment controls execution of the switching process in accordance with the result of the decision which is made by the musical performance decision unit 15. According to such physical and functional configurations, it becomes possible to preferably control execution of the switching process.

In addition, as described above, the plurality of musical performance operators that the electronic keyboard instrument 100 according to the second embodiment include is configured by the plurality of keys and the plurality of pedals. According to such physical and functional configurations, it becomes possible to preferably control execution of each switching process.

Although the first and second embodiments of the present disclosure are described above, the present disclosure is not limited to the first and second embodiments and it is possible to alter the present disclosure in a variety of ways within a range not deviating from the gist of the present disclosure.

For example, in the first and second embodiments, as a first modified example, the electronic keyboard instrument 100 may be configured such that in a case where the operation is performed on the first operation switch (104*a* or 104*b*) at a timing which comes before a reference time (for example, one second) which is set in advance passes with no decision by the musical performance decision unit 15 that the musical performance is conducted after the musical performance decision unit 15 decided that the musical performance is not conducted in the state where the electronic keyboard instrument 100 works in the operation lock AUTO mode, the switching process execution unit 16 does not execute the switching process which is correlated with the operated first operation switch. In the first modified example, in a case where the operation is performed on the first operation switch at a timing which comes after the reference time passes with no decision by the musical performance decision unit 15 that the musical performances is conducted after the musical performance decision unit 15 decided that the musical performance is not conducted in the state where the electronic keyboard instrument 100 works in the operation lock AUTO mode, the switching process execution unit 16 executes the switching process which is correlated with the operated first operation switch.

Specifically, in the first modified example, a no-performance-time timer which measures a no-performance-time, that is, a time which passes after the musical performance decision unit 15 decided that the musical performance is not conducted is set in a storage area of the RAM 112*c*. The no-performance-time timer starts measurement of the no-performance-time in accordance with the decision that the musical performance is not conducted by the musical performance decision unit 15. In a case where the musical performance decision unit 15 decides that the musical performance is conducted, measurement of the no-performance-time by the no-performance-time timer is terminated and a timer value of the no-performance-time is cleared. In accordance with whether the no-performance-time that the timer value of the no-performance-time timer indicates at a timing that the operation is performed on the first operation switch (104*a* or 104*b*) is more than the reference time, the switching process execution unit 16 decides whether that timing is a timing which comes before the reference time passes without deciding that the musical performance is conducted by the musical performance decision unit 15 after deciding that the musical performance is not conducted by the musical performance decision unit 15.

When the electronic keyboard instrument 100 works in the operation lock AUTO mode, there are cases where the musical performance decision unit 15 decides that the musical performance is not conducted due to temporal interruption of the musical performance operation while the musical performance is being conducted. For example, when the player touches his/her hand off the key for page turning while the musical performance is being conducted, there are cases where it is decided that the musical performance is not conducted. According to the configuration of the first modified example, in a case where it is decided that the musical performance operation is not conducted due to the temporal interruption of the musical performance operation and thereafter the operation is performed on the first operation switch (104*a* or 104*b*) against the player's will, when the timing that the operation is performed on the first operation switch is a timing which comes before the reference time passes after deciding that the musical performance operation is not conducted, the switching process is not executed. For example, in a case where it is decided that the musical performance is not conducted due to the temporal interruption of the musical performance operation for reasons that the player touches his/her finger off the key for page turning and thereafter the body or the clothes of the player who extends his/her arm for page turning touches the first operation switch unexpectedly, when the timing that touching occurs is a timing which comes before the reference time passes after deciding that the musical performance operation is not conducted, the switching process is not executed. Therefore, according to the configuration of the first modified example, it becomes possible to suppress the possibility that the musical performance would be hindered for reasons that the switching process is executed against the player's will.

In the first and second embodiments, a description is made on the presumption that it is decided that the operation is performed on the first operation switch (104*a* or 104*b*) and thereafter the decision of the current control mode of the electronic keyboard instrument 100 and the decision of whether the musical performance is conducted are made and thereby execution of the switching process is controlled in accordance with the results of these decisions. However, the above-described configuration is merely one example and as a second modified example, the decision of the current control mode of the electronic keyboard instrument 100 and the decision of whether the musical performance is conducted may be made prior to the decision of whether the operation is performed on the first operation switch. In the second modified example, in a case where it is decided that the current control mode of the electronic keyboard instrument 100 is the operation lock ON mode and in a case where it is decided that the current control mode of the electronic keyboard instrument 100 is the operation lock AUTO mode and it is decided the musical performance is conducted, the decision of whether the operation is performed on the first operation switch is not made. On the other hand, in a case where it is decided that the control mode of the electronic keyboard instrument 100 is the operation lock OFF mode and in a case where it is decided that the control mode of the electronic keyboard instrument 100 is the operation lock AUTO mode and it is decided that the musical performance is not conducted, it is decided whether the operation is performed on the first operation switch and execution of the switching process is controlled in accordance with a result of that decision. That is, in the case where it is decided that the operation is performed on the first operation switch, the switching operation which is correlated with the operated first operation switch is executed. On the other hand, in the case where it is decided that the operation is not performed on the first operation switch, the switching process is not executed. According to such physical and functional configurations, in a state where the electronic keyboard instrument 100*n* works in the operation lock AUTO mode and, in addition, the musical performance is conducted, that is, in a state where although the operation is performed on the first operation switch, the switching process which is correlated with that first operation switch is not executed, an unnecessary decision of whether the operation is performed on the first operation switch is not made and therefore it becomes possible to reduce a processing load which is exerted on the electronic keyboard instrument 100.

In the first embodiment, the description is made on the presumption that the musical performance decision unit 15 is configured to decide whether all the waveform generators 113*d* that the sound source LSI 113 includes generate the waveform signals and to decide whether the musical performance is conducted in accordance with the result of that decision. However, this configuration of the musical performance decision unit 15 is merely one example. In the following, a third modified example that the musical performance decision unit 15 is configured to decide whether some waveform generators 113*d* that the sound source LSI 113 includes generate the waveform signals and to decide whether the musical performance is conducted in accordance with a result of that decision will be described.

The electronic keyboard instrument 100 according to the third modified example has an accompaniment function and a metronome function. In a case where the accompaniment function is in an ON state, the electronic keyboard instrument 100 emits an accompaniment sound which is decided in advance regardless of whether the player conducts the musical performance operation on one musical performance operator, that is, both in a case where the player conducts the musical performance operation on that musical performance operator and in a case where the player does not conduct the musical performance operation on that musical performance operator. In a case where the metronome function is in the ON state, the electronic keyboard instrument 100 emits a metronome sound which is decided in advance regardless of whether the player conducts the musical performance operation on that musical performance operator. Specifically, in the third modified example, the sound source LSI 113 generates an accompaniment sound signal which indicates the accompaniment sound and a metronome sound signal which indicates the metronome sound and outputs the accompaniment sound signal and the metronome sound signal which are generated to the sound system 114 in accordance with control by the CPU 111 and the sound system 114 outputs the accompaniment sound and the metronome sound in accordance with the accompaniment sound signal and the metronome sound signal which are input into the sound system 114.

In the third modified example, each waveform generator 113*d* that the sound source LSI 113 includes belongs to either a first waveform generator group or a second waveform generator group. Each of the first waveform generator group and the second waveform generator group is configured by at least one waveform generator 113*d*. In the following, for easy understanding, one waveform generator 113*d* which configures the first waveform generator group will be referred to as a "first waveform generator" and another waveform generator 113*d* which configures the second waveform generator group will be referred to as a "second waveform generator".

Each first waveform generator which configures the first waveform generator group generates the waveform signal that the sound source LSI 113 uses for generation of each musical sound signal which indicates each musical sound. That is, the DSP 113*b* of the sound source LSI 113 performs signal processing on the waveform signals which are input from the respective first waveform generators, mixes the waveform signals which are subjected to the signal processing with one another and thereby generates one musical sound signal. The respective second waveform generators which configure the second waveform generator group generate waveform signals that the sound source LSI 113 uses for generation of the accompaniment sound signal and the metronome sound signal which are described above. That is, the DSP 113*b* generates the accompaniment sound signal and the metronome sound signal by mixing the waveform signals which are input from the respective second waveform generators with one another.

Each first waveform generator generates the waveform signal in accordance with the musical performance operations which are conducted on the plurality of musical performance operators, that is, 88 keys and 3 pedals that the electronic keyboard instrument 100 includes. On the other hand, in a case where the musical performance operation is not conducted on any of the plurality of musical performance generators that the electronic keyboard instrument 100 includes, each first waveform generator does not generate each waveform signal. On the other hand, at a timing that the accompaniment function or the metronome function is in the ON state and the accompaniment sound or the metronome sound is emitted, each second waveform generator generates the waveform signal regardless of whether the musical performance operation is conducted on each musical performance operator. That is, each second waveform generator generates the waveform signal in accordance with a factor which is different from the musical performance operation to be conducted on the musical performance operator. Incidentally, in a case where the accompaniment function or the metronome function is in an OFF state, each second waveform generator does not generate each waveform signal.

The musical performance decision unit 15 pertaining to the third modified example decides whether the musical performance is conducted not in accordance with whether each second waveform generator generates each waveform signal but in accordance with whether each first waveform generator generates each waveform signal. Specifically, in a case where at least one of the first waveform generators generates the waveform signal, the musical performance decision unit 15 decides that the musical performance is conducted in both cases where at least one of the second waveform generators generates the waveform signal and where none of the second wave generators generate the waveform signal. On the other hand, in a case where none of the first waveform generators generate the waveform signal, the musical performance decision unit 15 decides that the musical performance is not conducted in both cases where at least one of the second waveform generators generates the waveform signal and where none of the second waveform generators generate the waveform signal.

In the third modified example, in a case where the operation is performed on the first operation switch in the state where the electronic keyboard instrument 100 works in the operation lock AUTO mode as in the cases in the first embodiment and the second embodiment, the switching process execution unit 16 controls execution of the switching process in accordance with the result of the decision which is made by the musical performance decision unit 15.

According to such physical and functional configurations, in a case where the musical performance operation is conducted on at least one of the musical performance operators, it is decided that the musical performance is conducted on the basis that at least one of the first waveform generators generates the waveform signal even in a case where none of the second waveform generators generate the waveform signal and thereby execution of the switching process is controlled in accordance with the result of the decision which is made by the musical performance decision unit 15. In addition, in a case where the musical performance operation is not conducted on any of the musical performance operators, it is decided that the musical performance operation is not conducted on the basis that none of the first waveform generators generate the waveform signal, even in a case where at least one of the second waveform generators generates the waveform signal and thereby execution of the switching process is controlled in accordance with the result of the decision which is made by the musical performance decision unit 15. That is, according to such physical and functional configurations, it becomes possible to preferably decide whether the musical performance is conducted by the player on the basis of whether at least one of the first waveform generators generates the waveform signal and thereby to preferably control execution of the switching process in accordance with the result of the decision which is made by the musical performance decision unit 15. Further, according to such physical and functional configurations, since it is decided whether the musical performance is conducted with no consideration of whether the second waveform generator generates the waveform signal, it becomes possible to reduce the processing load which is exerted on the electronic keyboard instrument 100 in comparison with a case where it is decided whether all the waveform generators 113*d* that the sound source LSI 113 includes generate the waveform signals.

Incidentally, it is of course possible to provide a dedicated electronic musical instrument which includes constitutional elements for realization of the respective functions pertaining to the present disclosure in advance as the electronic musical instrument according to the present disclosure and it is also possible to make an existing electronic musical instrument function as the electronic musical instrument according to the present disclosure by application of a program. That is, it becomes possible to make the existing electronic musical instrument function as the electronic musical instrument according to the present disclosure by applying the program for realizing the respective functions of the electronic musical instrument according to the present disclosure in a manner that it becomes possible for a processor which controls the existing electronic musical instrument such as a CPU and so forth to execute the program.

Incidentally, a method of applying a program such as the above is optional. It is possible to apply the program by storing the program into a computer readable storage medium such as, for example, a flexible disc, a CD (Compact Disc)-ROM, a DVD (Digital Versatile Disc)-ROM, a memory card and so forth. Further, it is also possible to superimpose the program on carrier waves and thereby to apply the program via a communication medium such as the Internet and so forth. The program may be also distributed by posting the program on, for example, a bulletin board (BBS: Bulletin Board System) on a communication network. Then, the electronic keyboard instrument 100 may be also configured to make it possible to execute the above-mentioned processing by launching and executing the program similarly to other application programs under the control of an OS (Operating System).

Although the preferred embodiments of the present disclosure are described above, the present disclosure is not limited to such specific embodiments and the present disclosure includes the inventions which are described in the appended claims and the scope of equivalents thereof.

What is claimed is:

1. An electronic musical instrument comprising:

at least one musical performance operator that is operable by a user to perform a musical performance, the at least one performance operator being associated with a process for emission of a musical sound corresponding to the musical performance operator;

at least one function operator that is operable by the user by an operation distinct from an operation of the at least one musical performance operator, wherein the at least one function operator is associated with at least one process other than the process for emission of the musical sound; and at least one processor that is configured to:

in response to an operation of the at least one musical performance operator, execute the process for emission of the musical sound;

in response to an operation of the at least one function operator, determine whether the musical performance is being performed via operation of the at least one musical performance operator, in response to determining that the musical performance is not being performed, execute the at least one process associated with the operated at least one function operator, in response to determining that the musical performance is being performed, not execute the process associated with the operated at least one function operator, upon determining that the musical performance is not being performed, start measuring an elapsed time during which no musical performance is determined to be performed, in response to the operation of the at least one function operator at a first timing before the elapsed time reaches a reference time, not execute the process associated with the at least one function operator, and in response to the operation of the at least one function operator at a second timing when the elapsed time reaches or exceeds the reference time, execute the process associated with the at least one function operator.

2. The electronic musical instrument according to claim 1, further comprising:

a sound source which generates a musical sound signal which indicates the musical sound, wherein the sound source includes a plurality of waveform generators which each generate a waveform signal and generates the musical sound signal in accordance with the waveform signals that the plurality of waveform generators generate, wherein the at least one processor determines whether the musical performance is being performed depending on whether at least one of the plurality of waveform generators generates the waveform signal.

3. The electronic musical instrument according to claim 2, wherein:

the at least one musical performance operator comprises a plurality of musical performance operators, each of which is operable by the user to perform the musical performance, the plurality of waveform generators includes at least one first waveform generator and at least one second waveform generator, the at least one first waveform generator generates the waveform signal in accordance with an operation of any of the plurality of musical performance operators, and does not generate the waveform signal when there is no operation of any of the plurality of musical performance operators, the at least one second waveform generator generates the waveform signal in accordance with a factor which is different from an operation of any of the plurality of musical performance operators, and the at least one processor determines whether the musical performance is being performed depending on whether the at least one first waveform generator generates the waveform signal, regardless of whether the at least one second waveform generator generates the waveform signal.

4. The electronic musical instrument according to claim 1, wherein the at least one musical performance operator comprises a plurality of musical performance operators, each of which is operable by the user to perform the musical performance, and wherein the at least one processor determines whether the musical performance is being performed depending on whether at least one of the plurality of musical performance operators is being operated.

5. The electronic musical instrument according to claim 4, wherein one of the plurality of musical performance operators includes a key or a pedal.

6. A method for controlling an electronic musical instrument which includes (i) at least one musical performance operator that is operable by a user to perform a musical performance, the at least one performance operator being associated with a process for emission of a musical sound corresponding to the musical performance operator, and (ii) at least one function operator that is operable by the user by an operation distinct from an operation of the at least one musical performance operator, wherein the at least one function operator is associated with at least one process other than the process for emission of the musical sound, the method being executed by at least one processor, the method comprising:

receiving an operation of the at least one musical performance operator and executing the process for emission of the musical sound in response to the operation of the at least one musical performance operator, receiving an operation of the at least one function operator, and in response to the operation of the at least one function operator, determining whether the musical performance is being performed via operation of the at least one musical performance operator, in response to determining that the musical performance is not being performed, executing the at least one process associated with the operated at least one function operator, in response to determining that the musical performance is being performed, not executing the process associated with the operated at least one function operator, upon determining that the musical performance is not being performed, starting measurement of an elapsed time during which no musical performance is determined to be performed, receiving an operation of the at least one function operator at a first timing before the elapsed time reaches a reference time, and, in response to receiving the operation of the at least one function operator at the first timing, not executing the process associated with the at least one function operator, and receiving an operation of the at least one function operator at a second timing when the elapsed time reaches or exceeds the reference time, and, in response to receiving the operation of the at least one function operator at the second timing, executing the process associated with the at least one function operator.

7. The method according to claim 6, wherein the electronic musical instrument comprises a sound source which generates a musical sound signal which indicates the musical sound, the sound source including a plurality of waveform generators which each generate a waveform signal, the sound source generating the musical sound signal in accordance with the waveform signals that the plurality of waveform generators generate, the method further comprising:

generating, by the sound source, the musical sound signal, in accordance with the waveform signals generated by the plurality of waveform generators, and determining whether the musical performance is being performed depending on whether at least one of the plurality of waveform generators generates the waveform signal.

8. The method according to claim 7, wherein:

the plurality of waveform generators includes at least one first waveform generator and at least one second waveform generator, in generating the musical sound signal:

each waveform signal is generated by the at least one first waveform generator in accordance with an operation of the at least one musical performance operator, the waveform signal is not generated by the at least one first waveform generator when there is no operation of the at least one musical performance operator, the waveform signal is generated by the at least one second waveform generator in accordance with a factor which is different from an operation of the at least one musical performance operator, and the method comprises determining whether the musical performance is being performed depending on whether the at least one first waveform generator generates the waveform signal, regardless of whether the at least one second waveform generator generates the waveform signal.

9. The method according to claim 6, wherein the at least one musical performance operator comprises a plurality of musical performance operators, wherein the method comprises determining whether the musical performance is being performed depending on whether at least one of the plurality of musical performance operators is operated.

10. The method according to claim 9, wherein one of the plurality of musical performance operators includes a key or a pedal.

11. A non-transitory computer-readable storage medium having stored thereon a program that is executable by a computer of an electronic musical instrument which includes (i) at least one musical performance operator that is operable by a user to perform a musical performance, the at least one performance operator being associated with a process for emission of a musical sound corresponding to the musical performance operator, and (ii) at least one function operator that is operable by the user by an operation distinct from an operation of the at least one musical performance operator, wherein the at least one function operator is associated with at least one process other than the process for emission of the musical sound, the program being executable by the computer to control the computer to perform functions comprising:

in response to an operation of the at least one musical performance operator, executing the process for emission of the musical sound, in response to an operation of the at least one function operator, determining whether the musical performance is being performed via operation of the at least one musical performance operator, in response to determining that the musical performance is not being performed, executing the at least one process associated with the operated at least one function operator, in response to determining that the musical performance is being performed, not executing the process associated with the operated at least one function operator, upon determining that the musical performance is not being performed, start measuring an elapsed time during which no musical performance is determined to be performed, in response to the operation of the at least one function operator at a first timing before the elapsed time reaches a reference time, not execute the process associated with the at least one function operator, and in response to the operation of the at least one function operator at a second timing when the elapsed time reaches or exceeds the reference time, execute the process associated with the at least one function operator.

12. An electronic musical instrument comprising:

at least one musical performance operator that is operable by a user to perform a musical performance, the at least one performance operator being associated with a process for emission of a musical sound corresponding to the musical performance operator;

at least one function operator that is operable by the user by an operation distinct from an operation of the at least one musical performance operator, wherein the at least one function operator is associated with at least one process other than the process for emission of the musical sound; and at least one processor that is configured to:

set one of a first mode and a second mode in accordance with a mode setting operation by the user, and in response to an operation of the at least one function operator:

in a case in which the first mode is set, not execute the at least one process associated with the operated at least one function operator, and in a case in which the second mode is set:

determine whether the musical performance is being performed via operation of the at least one musical performance operator, in response to determining that the musical performance is not being performed, execute the at least one process associated with the operated at least one function operator, in response to determining that the musical performance is being performed, not execute the at least one process associated with the operated at least one function operator, upon determining that the musical performance is not being performed, start measuring an elapsed time during which no musical performance is determined to be performed, in response to the operation of the at least one function operator at a first timing before the elapsed time reaches a reference time, not execute the process associated with the at least one function operator, and in response to the operation of the at least one function operator at a second timing when the elapsed time reaches or exceeds the reference time, execute the process associated with the at least one function operator.

13. The electronic musical instrument according to claim 12, wherein the at least one processor is configured to set one of the first mode, the second mode, and a third mode in accordance with the mode setting operation by the user, and in response to the operation of the at least one function operator, in a case in which the third mode is set, execute the at least one process associated with the operated at least one function operator, regardless of whether the musical performance is being performed.

14. A method for controlling an electronic musical instrument which includes (i) at least one musical performance operator that is operable by a user to perform a musical performance, the at least one performance operator being associated with a process for emission of a musical sound corresponding to the musical performance operator, (ii) at least one function operator that is operable by the user by an operation distinct from an operation of the at least one musical performance operator, the at least one function operator being associated with at least one process other than the process for emission of the musical sound, and (iii) a sound source which generates a musical sound signal which indicates the musical sound, the sound source including a plurality of waveform generators which each generate a waveform signal, the plurality of waveform generators including at least one first waveform generator and at least one second waveform generator, the sound source generating the musical sound signal in accordance with the waveform signals that the plurality of waveform generators generate, the method being executed by at least one processor, and the method comprising:

receiving an operation of the at least one musical performance operator and executing the process for emission of the musical sound in response to the operation of the at least one musical performance operator, receiving an operation of the at least one function operator, and in response to the operation of the at least one function operator, determining whether the musical performance is being performed via operation of the at least one musical performance operator, in response to determining that the musical performance is not being performed, executing the at least one process associated with the operated at least one function operator, in response to determining that the musical performance is being performed, not executing the process associated with the operated at least one function operator, generating, by the sound source, the musical sound signal, in accordance with the waveform signals generated by the plurality of waveform generators, determining whether the musical performance is being performed depending on whether at least one of the plurality of waveform generators generates the waveform signal, and in generating the musical sound signal:

each waveform signal is generated by the at least one first waveform generator in accordance with an operation of the at least one musical performance operator, the waveform signal is not generated by the at least one first waveform generator when there is no operation of the at least one musical performance operator, and the waveform signal is generated by the at least one second waveform generator in accordance with a factor which is different from an operation of the at least one musical performance operator, wherein the method comprises determining whether the musical performance is being performed depending on whether the at least one first waveform generator generates the waveform signal, regardless of whether the at least one second waveform generator generates the waveform signal.

* * * * *